(12) United States Patent
Grzeszczuk et al.

(10) Patent No.: US 9,710,492 B2
(45) Date of Patent: Jul. 18, 2017

(54) METHOD AND APPARATUS FOR REPRESENTING AND IDENTIFYING FEATURE DESCRIPTORS UTILIZING A COMPRESSED HISTOGRAM OF GRADIENTS

(75) Inventors: Radek Grzeszczuk, Menlo Park, CA (US); Vijay Chandrasekhar, Stanford, CA (US); Gabriel Takacs, Santa Clara, CA (US); Bernd Girod, Stanford, CA (US)

(73) Assignee: Nokia Technologies Oy, Espoo (FI)

( * ) Notice: Subject to any disclaimer, the term of this patent is extended or adjusted under 35 U.S.C. 154(b) by 580 days.

(21) Appl. No.: 12/617,514

(22) Filed: Nov. 12, 2009

(65) Prior Publication Data

US 2010/0226575 A1    Sep. 9, 2010

Related U.S. Application Data

(60) Provisional application No. 61/113,891, filed on Nov. 12, 2008.

(51) Int. Cl.
G06K 9/46 (2006.01)
G06F 17/30 (2006.01)
(Continued)

(52) U.S. Cl.
CPC ..... *G06F 17/30256* (2013.01); *G06K 9/4642* (2013.01); *G06T 9/20* (2013.01);
(Continued)

(58) Field of Classification Search
CPC ... G06F 17/30256; G06K 9/4642; G06T 9/20; G06T 9/40; H04N 19/14; H04N 19/96
See application file for complete search history.

(56) References Cited

U.S. PATENT DOCUMENTS 6,363,381 B1 * 3/2002 Lee et al.
6,385,332 B1    5/2002 Zahalka et al.
(Continued)

FOREIGN PATENT DOCUMENTS

EP    1276324 A1    1/2003
EP    1548616 A2 *  6/2005
(Continued)

OTHER PUBLICATIONS

Takacs et al., "Outdoors augmented reality on mobile phone using loxel-based visual feature organization," In Proceeding of ACM international conference on Multimedia Information Retrieval (MIR), pp. 427-434, 2008.*

(Continued)

Primary Examiner — Nirav G Patel
(74) Attorney, Agent, or Firm — Alston & Bird LLP

(57) ABSTRACT

A method, apparatus and computer program product may be provided for generating a plurality of compressed feature descriptors that can be represented by a relatively small number of bits, thereby facilitating transmission and storage of the feature descriptors. A method, apparatus and computer program product may also be provided for permitting a compressed representation of a feature descriptor to be compared with a plurality of compressed representations of feature descriptors of respective predefined features. By permitting the comparison to be performed utilizing compressed representations of feature descriptors, a respective feature descriptor may be identified without having to first decompress the feature descriptor, thereby potentially increasing the efficiency with which feature descriptors may be identified.

18 Claims, 11 Drawing Sheets

(51) Int. Cl.
G06T 9/20 (2006.01)
G06T 9/40 (2006.01)
H04N 19/96 (2014.01)
H04N 19/14 (2014.01)
(52) U.S. Cl.
CPC .............. *G06T 9/40* (2013.01); *H04N 19/14* (2014.11); *H04N 19/96* (2014.11)

(56) References Cited

U.S. PATENT DOCUMENTS

| | | | |
|---|---|---|---|
| 6,643,387 | B1 | 11/2003 | Sethuraman et al. |
| 6,694,311 | B1 | 2/2004 | Smith |
| 6,711,293 | B1 | 3/2004 | Lowe |
| 6,888,965 | B1 | 5/2005 | Rath et al. |
| 7,130,446 | B2 | 10/2006 | Rui et al. |
| 7,162,338 | B2 | 1/2007 | Goncalves et al. |
| 7,668,376 | B2 | 2/2010 | Lin et al. |
| 7,738,705 | B2 | 6/2010 | Casadei |
| 7,761,466 | B1 | 7/2010 | Eshghi |
| 7,822,264 | B2 | 10/2010 | Balslev et al. |
| 7,831,094 | B2 | 11/2010 | Gupta et al. |
| 8,054,170 | B1* | 11/2011 | Brandt et al. ............... 340/453 |
| 8,131,074 | B2 | 3/2012 | Owechko |
| 8,165,401 | B2 | 4/2012 | Funayama et al. |
| 8,165,407 | B1 | 4/2012 | Khosla et al. |
| 8,189,866 | B1 | 5/2012 | Gu et al. |
| 8,244,044 | B2 | 8/2012 | Hua et al. |
| 8,285,118 | B2 | 10/2012 | Bronstein et al. |
| 8,306,366 | B2 | 11/2012 | Kwon et al. |
| 8,336,761 | B1 | 12/2012 | McCloskey |
| 8,351,649 | B1 | 1/2013 | Medioni et al. |
| 8,358,840 | B2 | 1/2013 | Bronstein et al. |
| 8,363,973 | B2 | 1/2013 | Liu et al. |
| 8,396,286 | B1 | 3/2013 | Aradhye et al. |
| 2003/0121035 | A1 | 6/2003 | Ro |
| 2005/0025364 | A1 | 2/2005 | Kim et al. |
| 2006/0013497 | A1 | 1/2006 | Yang et al. |
| 2007/0009159 | A1 | 1/2007 | Fan |
| 2008/0144124 | A1* | 6/2008 | Samadani et al. ........... 358/453 |
| 2008/0212873 | A1 | 9/2008 | Allen |
| 2008/0268876 | A1 | 10/2008 | Gelfand et al. |
| 2009/0048842 | A1 | 2/2009 | Albrecht et al. |
| 2010/0011392 | A1 | 1/2010 | Bronstein et al. |
| 2011/0038545 | A1 | 2/2011 | Bober et al. |

FOREIGN PATENT DOCUMENTS

| | | | |
|---|---|---|---|
| EP | 1594078 A2 | | 11/2005 |
| EP | 1850270 A1 | | 10/2007 |
| JP | 2005149167 A | * | 6/2005 |
| KR | 10-2009-0074690 | | 7/2009 |
| WO | 03065063 A2 | | 8/2003 |
| WO | 2007128452 | | 11/2007 |
| WO | 2007130688 A2 | | 11/2007 |
| WO | WO 2007130688 A2 | * | 11/2007 |
| WO | 2009129243 A1 | | 10/2009 |

OTHER PUBLICATIONS

Dalal, Navneet, and Bill Triggs. "Histograms of oriented gradients for human detection." Computer Vision and Pattern Recognition, 2005. CVPR 2005. IEEE Computer Society Conference on. vol. 1. IEEE, 2005.*

Ahonen et al., "Rotation invariant image description with local binary pattern histogram fourier features," in Image Analysis, SCIA 2009 Proceedings, Lecture Notes in Computer Science 5575, 2009, pp. 61-70.

Nguyen et al., "SURFTrac: Efficient Tracking and Continuous Object Recognition using Local Feature Descriptors", IEEE CVPR 2009, Miami, Florida (2009).

Banerjee et al., "Clustering with bregman divergences," in Journal of Machine Learning Research, 2004, pp. 234-245.

Takacs et al., "Outdoors augmented reality on mobile phone using loxel-based visual feature organization", In Proceeding of ACM international conference on Multimedia Information Retrieval (MIR), pp. 427-434, 2008.

Chandrasekhar et al., "CHoG: Compressed histogram of gradients—Low Bit-Rate Feature Descriptors", Conference: Computer Vision and Pattern Recognition—CVPR , pp. 2504-2511, 2009.

Bay et al., "SURF: Speeded Up Robust Features," in ECCV (1), 2006, pp. 404-417.

Birchfield, "KLT: An Implementation of the Kanade-Lucas-Tomasi Feature Tracker," 2007, http://www.ces.clemson.edu/~stb/klt.

Brasnett et al., "A Robust Visual Identifier Using the Trace Transform," in Visual Information Engineering Conference (VIE), Jul. 2007.

Brown et al., "Automatic Panoramic Image Stitching Using Invariant Features," in International Journal of Computer Vision, vol. 74, No. 1, 2007, pp. 59-77.

Calonder et al., "Compact Signatures for High-speed Interest Point Description and Matching," in Proc. International Conf. on Computer Vision (ICCV), 2009.

IEEE802s.16—IEEE Standard for Local and metropolitan area networks Part 16: Air Interface for Broadband Wireless Access Systems, May 29, 2009.

Chang et al., "Direction Adaptive Partitioned Block Transform for Image Coding," in Proceedings of ICIP 2008, San Diego, USA, 2008.

Winder et al., "Picking the best DAISY," in Conference on Computer Vision and Pattern Recognition, 2009.

Yeo et al., "Rate-Efficient Visual Correspondences Using Random Projections," IEEE, 2008.

Fischler et al., "Random Sample Consensus: A paradigm for model fitting with applications to image analysis and automated cartography," Communications of ACM, vol. 24, No. 6, pp. 381-395, 1981.

Gagie, "Compressing Probability Distributions," Inf. Process. Lett., vol. 97, No. 4, pp. 133-137, 2006.

Hua et al, "Discriminant Embedding for Local Image Descriptors," in Proc. of International Conference on Computer Vision (ICCV). IEEE Computer Society, 2007.

Jegou et al., "Hamming embedding and weak geometric consistency for large scale image search," in Proc. of European Conference on Computer Vision (ECCV), Berlin, Heidelberg, 2008, pp. 304-317.

Ke et al., "PCA-SIFT: A More Distinctive Representation for Local Image Descriptors," in Proc. of Conference on Computer Vision and Pattern Recognition (CVPR), vol. 02. IEEE Computer Society, 2004, pp. 506-513.

Kingsbury, "Rotation-Invariant Local Feature Matching with Complex Wavelets," in Proc. European Conf. Signal Processing (EUSIPCO), 2006.

Klein et al., "Parallel tracking and mapping on a camera phone," in Proc. Eigth IEEE and ACM International Symposium on Mixed and Augmented Reality (ISMAR'09), Orlando, Oct. 2009.

Lowe, "Distinctive Image Features from Scale-Invariant Keypoints," International Journal of Computer Vision, vol. 60, No. 2, pp. 91-110, 2004.

Mikolajczyk et al., "A Comparison of Affine Region Detectors," Int. J. Comput. Vision, vol. 65, No. 1-2, pp. 43-72, 2005.

Mikolajczyk et al., "Performance Evaluation of Local Descriptors," IEEE Trans. Pattern Anal. Mach. Intell.,vol. 27, No. 10, pp. 1615-1630, 2005.

Nistér et al., "Scalable Recognition with a Vocabulary Tree," in IEEE Conference on Computer Vision and Pattern Recognition (CVPR), vol. 2, 2006, pp. 2161-2168.

Philbin et al., "Lost in quantization—Improving particular object retrieval in large scale image databases," in CVPR, Anchorage, Alaska, Jun. 2008.

Philbin et al., "Object Retrieval with Large Vocabularies and Fast Spatial Matching," in CVPR, Minneapolis, Minnesota, 2007.

Rosten et al., "Machine Learning for High Speed Corner Detection," in 9th Euproean Conference on Computer Vision, vol. 1, Apr. 2006, p. 430443.

Se et al., "Vision-Based Global Localization and Mapping for Mobile Robots," in IEEE Transactions on Robotics, vol. 21, No. 3, 2007, pp. 364-375.

(56) References Cited

OTHER PUBLICATIONS

Shakhnarovich et al., "Learning Task-Specific Similarity," Thesis, 2005.
Shakhnarovich et al., "Fast Pose Estimation with Parameter-Sensitive Hashing," in ICCV '03:Proceedings of the Ninth IEEE International Conference on Computer Vision. Washington, DC, USA: IEEE Computer Society, 2003, p. 750.
Snavely et al., "Photo Tourism: Exploring Photo Collections in 3D," in SIGGRAPH Conference Proceedings. New York, NY, USA: ACM Press, 2006, pp. 835-846.
Takacs et al.,"Feature Tracking for Mobile Augmented Reality Using Video Coder Motion Vectors," in ISMAR '07: Proceedings of the Sixth IEEE and ACM International Symposium on Mixed and Augmented Reality, 2007.
Taylor et al., "Robust Feature Matching in 2.3us," in Conference on Computer Vision and Pattern Recognition, Jun. 2009.
Taylor et al., "Multiple target localization at over 100 FPS," in British Machine Vision Conference, London, UK, Sep. 2009.
Tola et al., "A Fast Local Descriptor for Dense Matching," in Conference on Computer Vision and Pattern Recognition, 2008.
Torralba et al., "Small Codes and Large Image Databases for Recognition," in CVPR, 2008.
Tsai et al., "Rate Efficient Real Time CD Cover Recognition on a Camera Phone," in ACM Multimedia Vancouver, British Columbia, Canada, Oct. 2008.
Wagner et al., "Multiple target detection and tracking with guaranteed framerates on mobile phones," in ISMAR, Orlando, FL, USA, 2009.
Winder et al., "Learning Local Image Descriptors," in Computer Vision and Pattern Recognition, 2007. CVPR '07. IEEE Conference on, 2007, pp. 1-8. [Online]. Available: http://dx.doi.org/10.1109/CVPR.2007.382971.
International Search Report and Written Opinion received in Corresponding Patent Cooperation Treaty Application No. PCT/IB2010/055280, dated Mar. 4, 2011, 15 pages.
IEEE802.11—IEEE Standard for Information technology—Telecommunications and information exchange between systems—Local and metropolitan area networks—Specific requirements Part 11: Wireless LAN Medium Access Control (MAC) and Physical Layer (PHY) Specifications, Jun. 12, 2007.
IEEE802.15.1 IEEE Standard for Information Technology—Telecommuncations and Information exchange between systems—local and metropolitan area networks—specific requirements—Part 15.1: Wireless Medium Access Control (MAC) and Physical layer (PHY) Specifications for Wireless Personal Area Networks (WPANs), Jun. 15, 2005.
Brown, Matthew, "Multi-Image Matching using Multi-Scale Oriented Patches", Proceedings of the 2005 IEEE Computer Society Conference on Computer Vision and Pattern Recognition, 1063-6919/05. pp. 510-517.
Wagner, Daniel "Pose Tracking from Natural Features on Mobile Phones", 7th IEEE International Symposium on Mixed and Augmented Reality, ISBN 978-1-4244-2859-5/08, Sep. 15-18, 2008. pp. 125-134.
Wagner, Daniel, "Real-Time Detection and Tracking for Augmented Reality on Mobile Phones", In: IEEE Transactions on Visualization and Computer Graphics, ISSN 1077-2626, vol. 16, No. 3, May/Jun. 2010, pp. 355-368.
Takacs, Gabriel, "Unified Real-Time Tracking and Recognition with Rotation-Invariant Fast Features", In: 2010 IEEE Conference on Computer Vision and Pattern Recognition (CVPR), Jun. 13-18, 2010, pp. 934-941.
International Search Report and Written Opinion of the International Searching Authority from corresponding Patent Cooperation Treaty Application No. PCT/IB2009/007434, dated Mar. 2, 2010, 18 pages.
Tao et al., "Recognition and Retrieval of Textured Images Using Gradient Indexing", Image Processing, Proceedings, Oct. 4, 1998, vol. 1, pp. 57-61, International Conference on Chicago, IL, USA, Oct. 1998.
Huang et al., "Image Retrieval by Texture Similarity", Pattern Recognition, Elsvier, Mar. 2003, vol. 36, No. 3, pp. 665-679.
Bay et al., "Speeded-up Robust Features (SURF)", Computer Vision and Image Understanding, Jun. 2008, vol. 110, No. 3, pp. 346-359.
Office Action for Korean Application No. 10-2011-7013513 dated Jun. 25, 2013.
Office Action for Korean Application No. 10-2011-7013513 dated Nov. 28, 2012.
Chandrasekhar, V., et al.; "CHoG: Compressed Histogram of Gradients—A Low Bit-Rate Feature Descriptor;" Conference Computer Vision and Pattern Recognition—CVPR; pp. 2504-2511; dated 2009.
Chandrasekhar, V., et al.; "Transform coding of image feature descriptors;" Stanford University; dated Jan. 2009; retrieved on Feb. 26, 2014 from <https://www.researchgate.net/publication/228971797_Transform_coding_of_image_feature_descriptors?ev=srch_pub>.
Gibson, S., et al.; "Analysing and simpling histograms using scale-trees;" 11$^{th}$ International Conference on Image Analysis and Processing, 2001; pp. 84-89; dated Sep. 2001; retrieved on Nov. 3, 2008.
Gibson, S., et al.; "Recognition and retrieval via histogram trees;" British Machine Vision Association; pp. 531-540; dated 2001.
Office Action for Chinese Application No. 200980150124.5; dated Jan. 28, 2014.
Lazebnik et al., *Beyond Bags of Features: Spatial Pyramid Matching for Recognizing Natural Scene Categories*, Proceedings of the 2006 IEEE Computer Society Conference on Computer Vision and Pattern Recognition (2006) 1-8.
Notice of Allowance for U.S. Appl. No. 12/949,455 dated Nov. 15, 2013.
Office Action for Korean Application No. 10-2012-7015881 dated Sep. 26, 2013.
Office Action for Russian Application No. 2011123115 dated Apr. 2, 2013.
Office Action for Russian Application No. 2012124836/08(038029) dated Sep. 17, 2013.
Office Action for U.S. Appl. No. 12/949,455 dated Jul. 26, 2012.
Office Action for U.S. Appl. No. 12/949,455 dated May 9, 2013.
Extended European Search Report for European Application No. 10 831 245.5 dated Feb. 16, 2017.
Chen, J. et al., *Real-Time Multi-Modal Rigid Registration Based on a Novel Symmetric-SIFT Descriptor*, Progress in Natural Science, Science Press, vol. 19, No. 5 (May 10, 2009) 643-651.
Heymann, S. et al., *SIFT Implementation and Optimization for General-Purpose CPU*, Full Papers Proceedings: The 15$^{th}$ International Conference in Central European on Computer Graphics, Visualization and Computer Vision 2007 in Co-Operation With Eurographics: University of West Bohemia Plzen Czech Republic (Jan. 29, 2007) 317-322.
Li, C. et al., *A New Framework for Feature Descriptor Based on SIFT*, Pattern Recognition Letters, vol. 30, No. 1 (Apr. 1, 2009) 544-557.
Murphy, M. et al., *Image Feature Extraction for Mobile Processors*, Workload Characterization, 2009, IISWC 2009. IEEE International Symposium on, IEEE, Oct. 4, 2009, p. 138-147.

\* cited by examiner

METHOD AND APPARATUS FOR REPRESENTING AND IDENTIFYING FEATURE DESCRIPTORS UTILIZING A COMPRESSED HISTOGRAM OF GRADIENTS

CROSS-REFERENCE TO RELATED APPLICATION

The present application claims priority from U.S. Provisional Patent Application No. 61/113,891 filed Nov. 12, 2008, the contents of which are incorporated herein.

TECHNOLOGICAL FIELD

Embodiments of the present invention relate generally to image processing and feature recognition and, more particularly, to the generation and identification of feature descriptors representative of predefined features within an image.

BACKGROUND

In a number of applications, it has become desirable to be able to identify features within an image. For example, an image may be captured that includes a distinctive building, a landmark or the like and it may be desirable to identify the building, landmark or the like in an automated fashion. In this regard, the identification of features within an image is utilized in computer vision and image retrieval applications and is being increasingly utilized for real-time object recognition, three-dimensional reconstruction, panorama stitching, robotic mapping and video tracking.

For example, an image may be captured by a mobile device, such as a mobile telephone, a digital camera or the like. The mobile device may then transmit the image or feature descriptors representative of various features of the image to a network entity, such as an application server. A network entity may then compare the image or the feature descriptors representative of the image to a number of predefined images or the feature descriptors of a number of predefined images. By identifying the closest match, the network entity may identify a feature within the image, such as a distinctive building, landmark or the like.

BRIEF SUMMARY

A method, apparatus and computer program product are therefore provided according to one embodiment for generating a plurality of compressed feature descriptors that can be represented by a relatively small number of bits, thereby facilitating transmission and storage of the feature descriptors. A method, apparatus and computer program product are also provided according to another embodiment of the present invention for permitting a compressed representation of a feature descriptor to be compared with a plurality of compressed representations of feature descriptors of respective predefined features. By permitting the comparison to be performed utilizing compressed representations of feature descriptors, a respective feature descriptor can be identified without having to first decompress the feature descriptor, thereby potentially increasing the efficiency with which feature descriptors may be identified.

In one embodiment, a method is provided for generating feature descriptors that include a relatively small number of bits. In this regard, the method may determine a plurality of gradients for each of a plurality of cells of an image. The method may also assign the gradient for a respective cell to a respective one of a plurality of bins, thereby quantizing the gradients. A plurality of feature descriptors may then be determined with each feature descriptor including a representation of the distribution of gradients between the plurality of bins of a respective cell. The plurality of feature descriptors may then be compressed, such as by utilizing tree coding. By determining the feature descriptors in this fashion and then compressing the resulting feature descriptors, such as by utilizing tree coding, the feature descriptors may be represented with a relatively small number of bits, thereby facilitating the transmission, storage and/or processing of the feature descriptors.

In another embodiment, a method is provided for identifying a feature based upon a compressed representation of a feature descriptor. In this regard, a compressed representation of a feature descriptor may be compared with a plurality of compressed representations of feature descriptors of respective predefined features. Based upon the comparison, the compressed representation of a feature descriptor may be identified to represent a predefined feature without having to first decompress the feature descriptor. By permitting the comparison and identification without requiring decompression of the feature descriptor, the identification process may proceed in an efficient manner.

In other embodiments of the present invention, a corresponding processor and a corresponding computer program product may be provided. In this regard, an apparatus of one embodiment may include a processor configured to perform each of the foregoing functions. In other embodiments, a computer program product may be provided that includes at least one computer-readable storage medium having computer-executable program code instructions stored therein with the computer-executable program code instructions including program code instructions configured to perform each of the foregoing functions.

As such, embodiments of the method, apparatus and computer program product may permit feature descriptors to be defined and compressed in a manner that reduces the number of bits that are transmitted and/or stored, such as in conjunction with applications configured to identify particular features. Other embodiments of the method, apparatus and computer program product may provide for the identification of a predefined feature based upon a comparison that is conducted with a compressed representation of a feature descriptor, thereby facilitating the efficient identification of features without having to decompress the feature descriptors.

BRIEF DESCRIPTION OF THE SEVERAL VIEWS OF THE DRAWINGS

Figure 1:
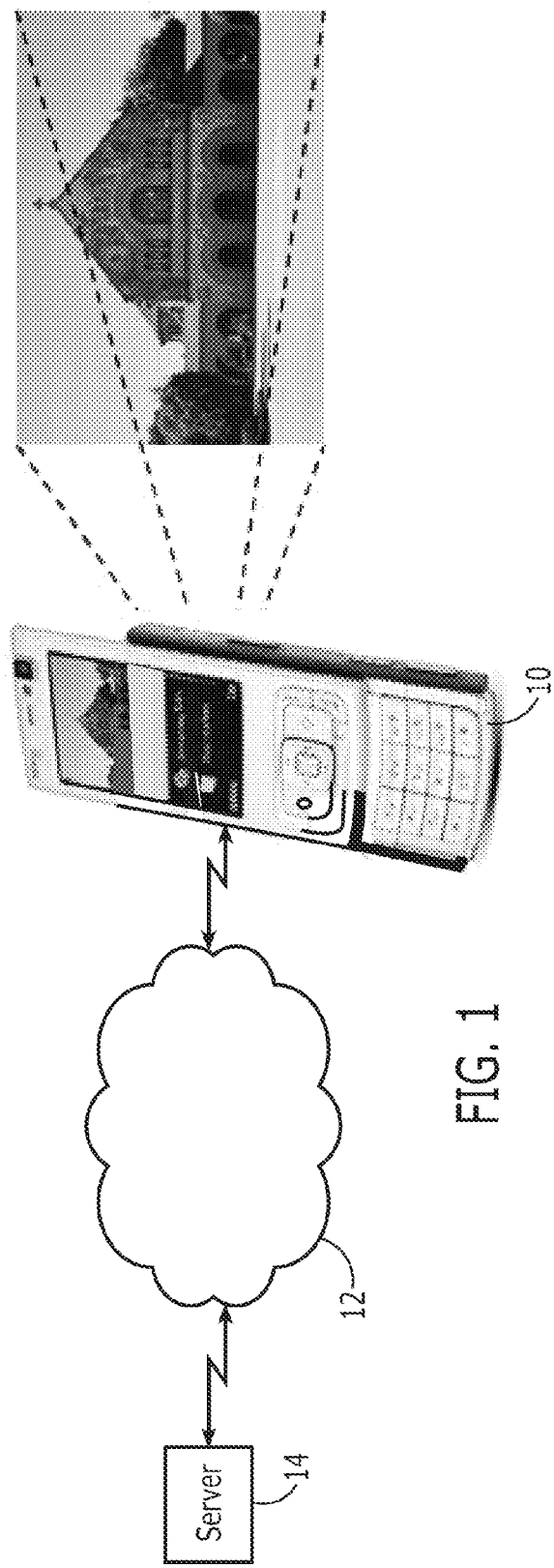
Figure 2:
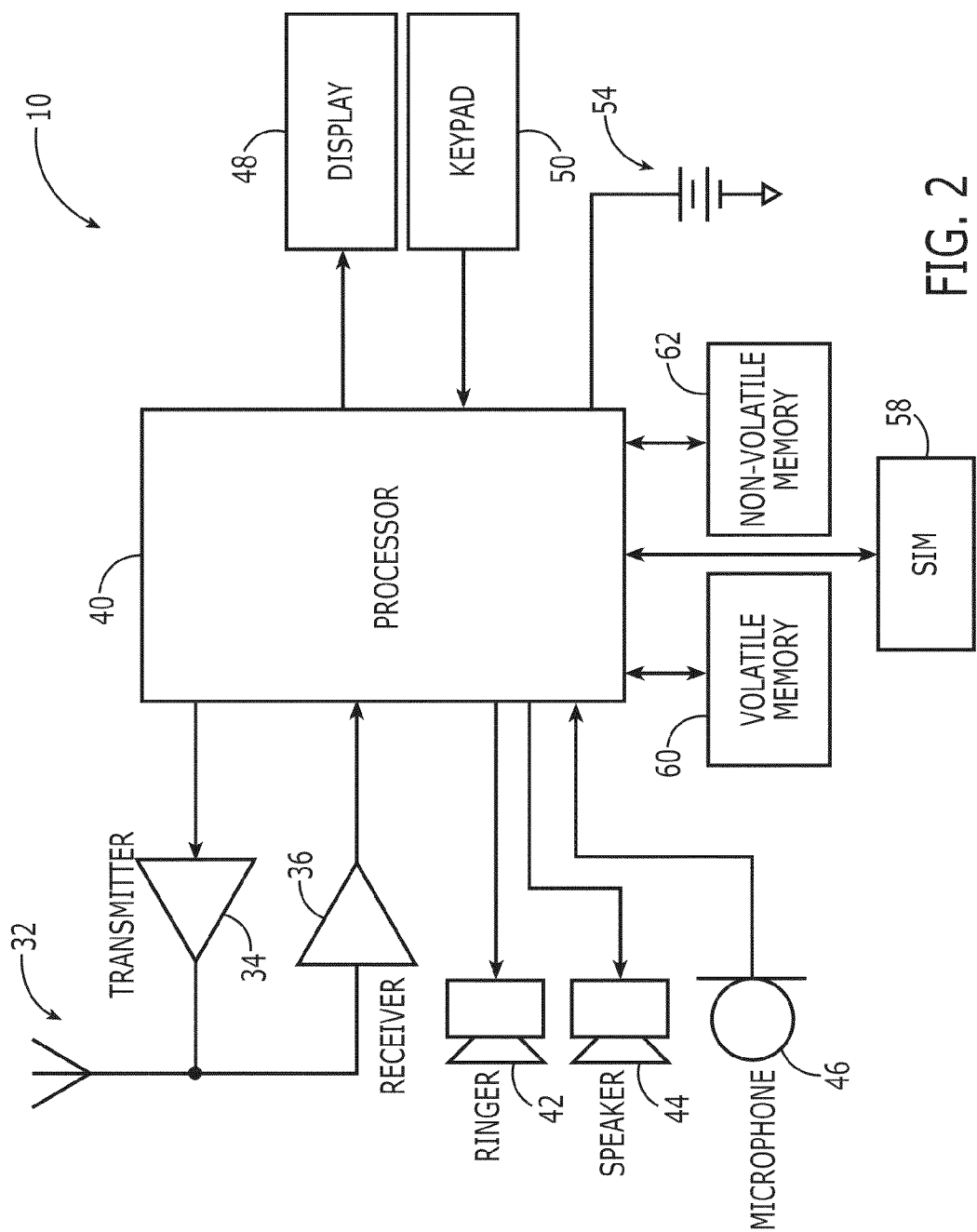
Figure 3:
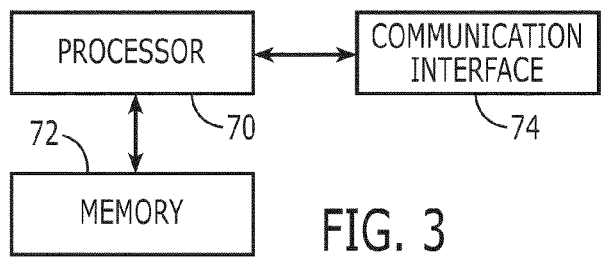
Figure 4:
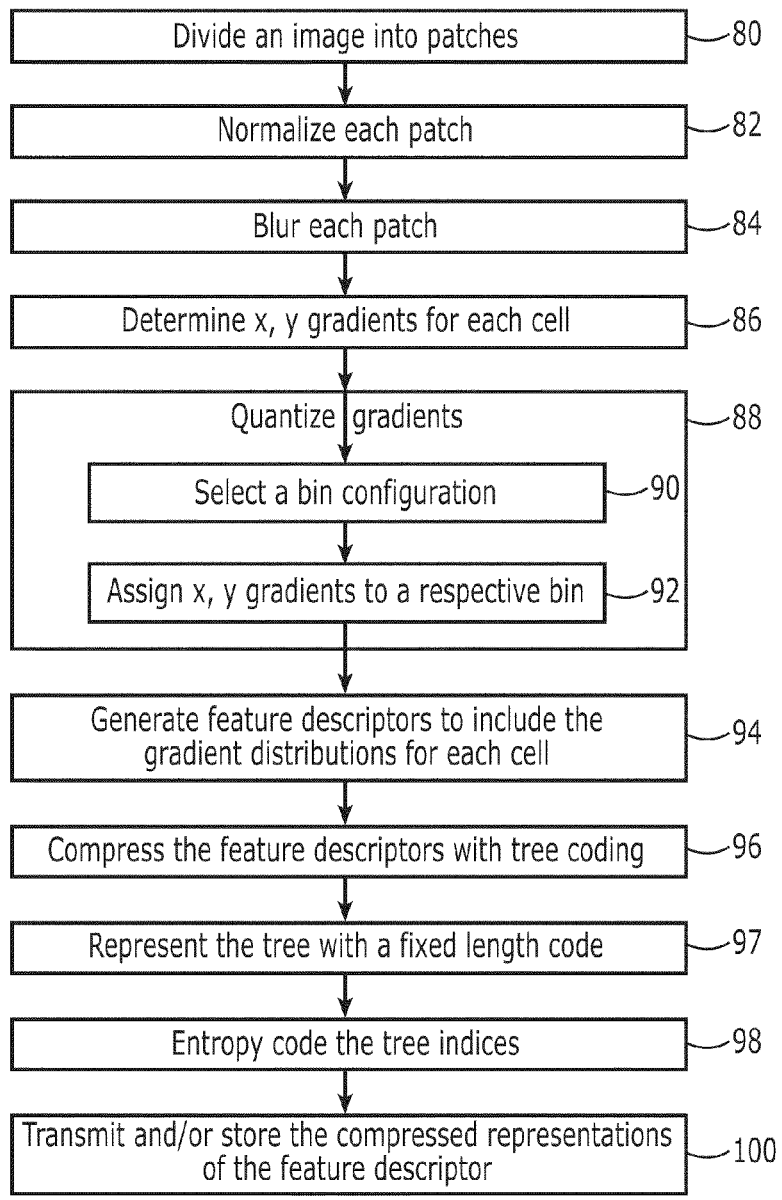
Figure 5B:
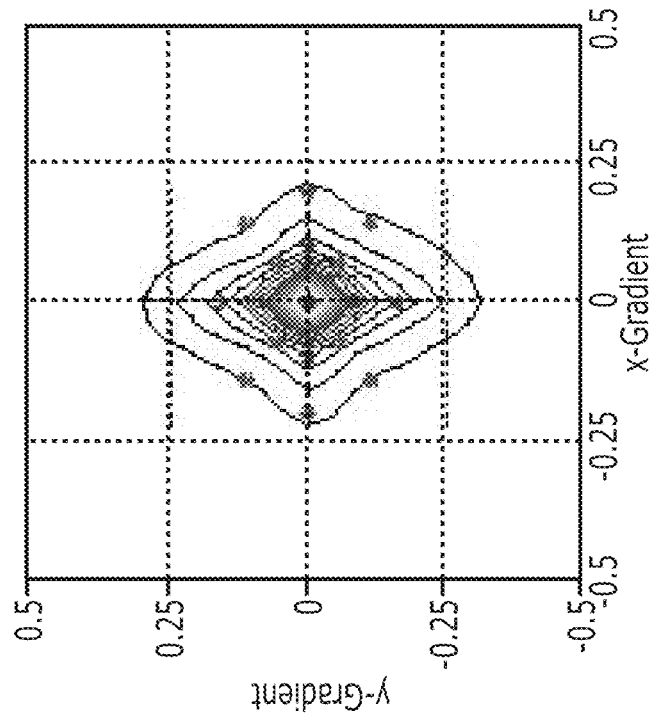
Figure 5A:
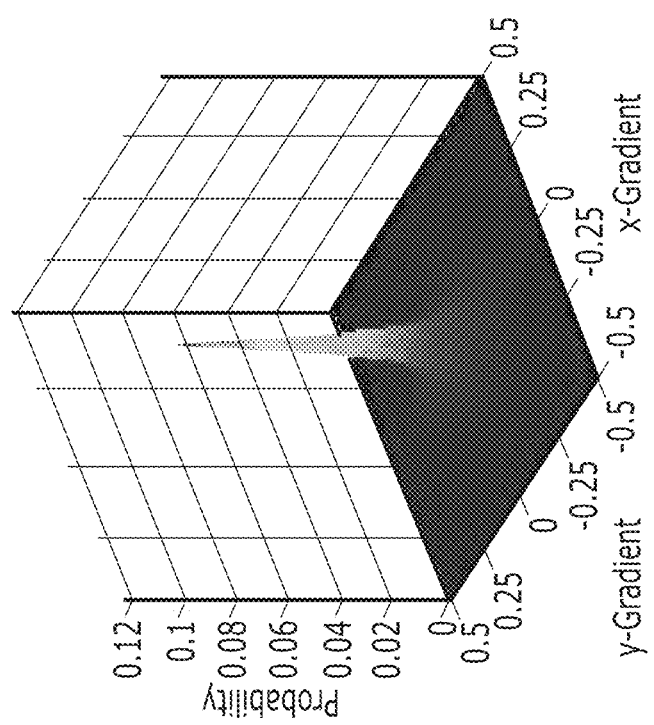
Figure 6A:
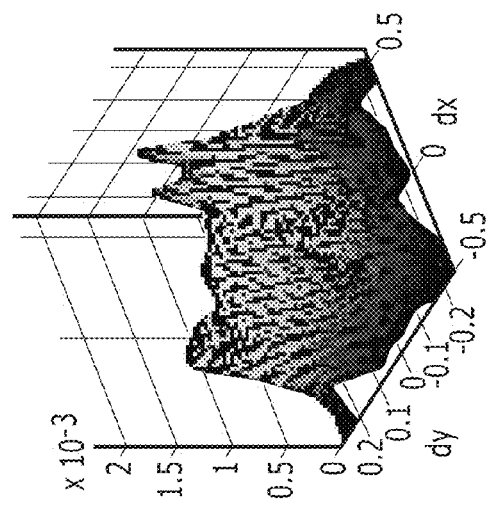
Figure 6B:
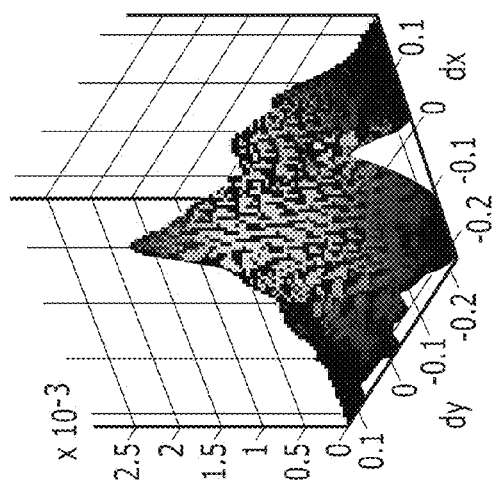
Figure 6C:
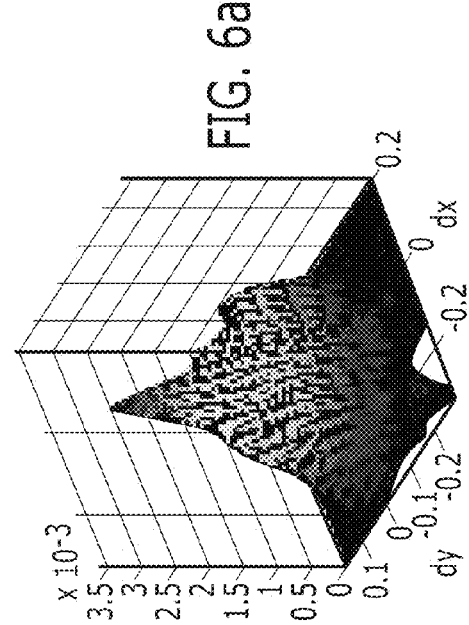
Figure 6D:
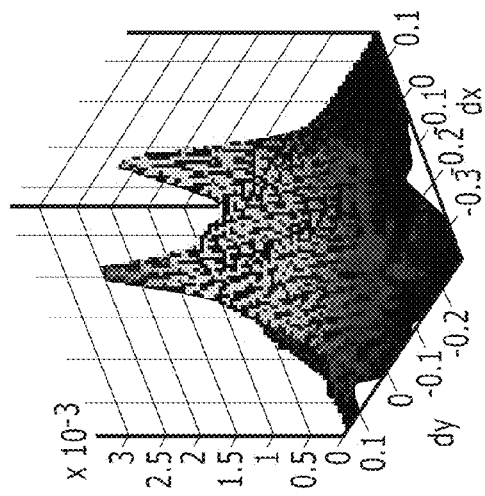
Figure 7B:
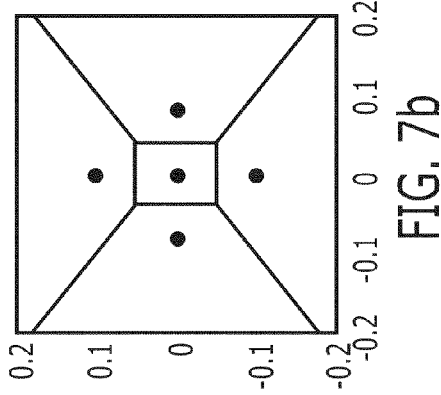
Figure 7E:
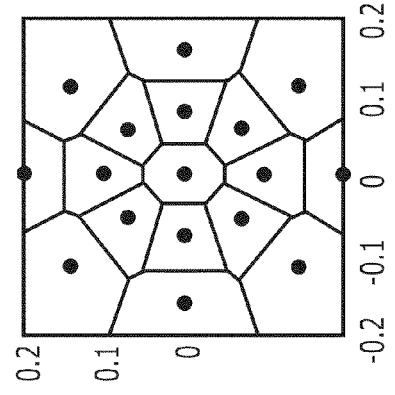
Figure 7C:
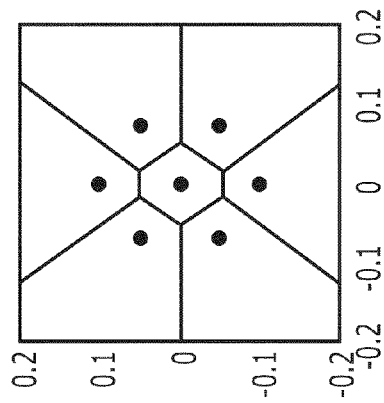
Figure 7A:
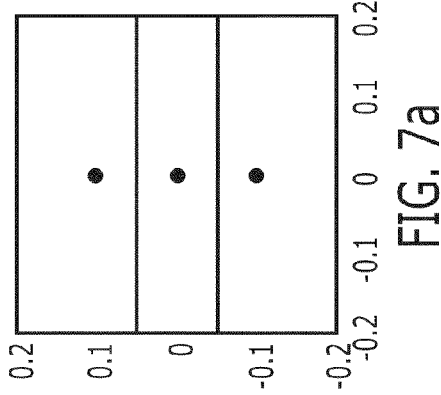
Figure 7D:
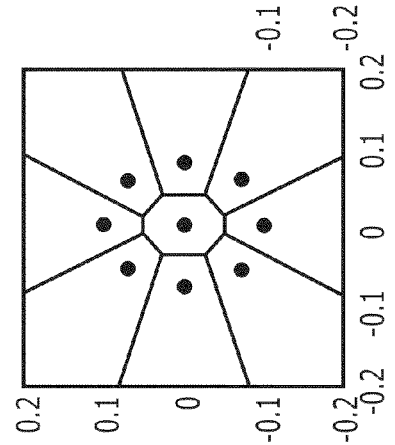
Figure 8:
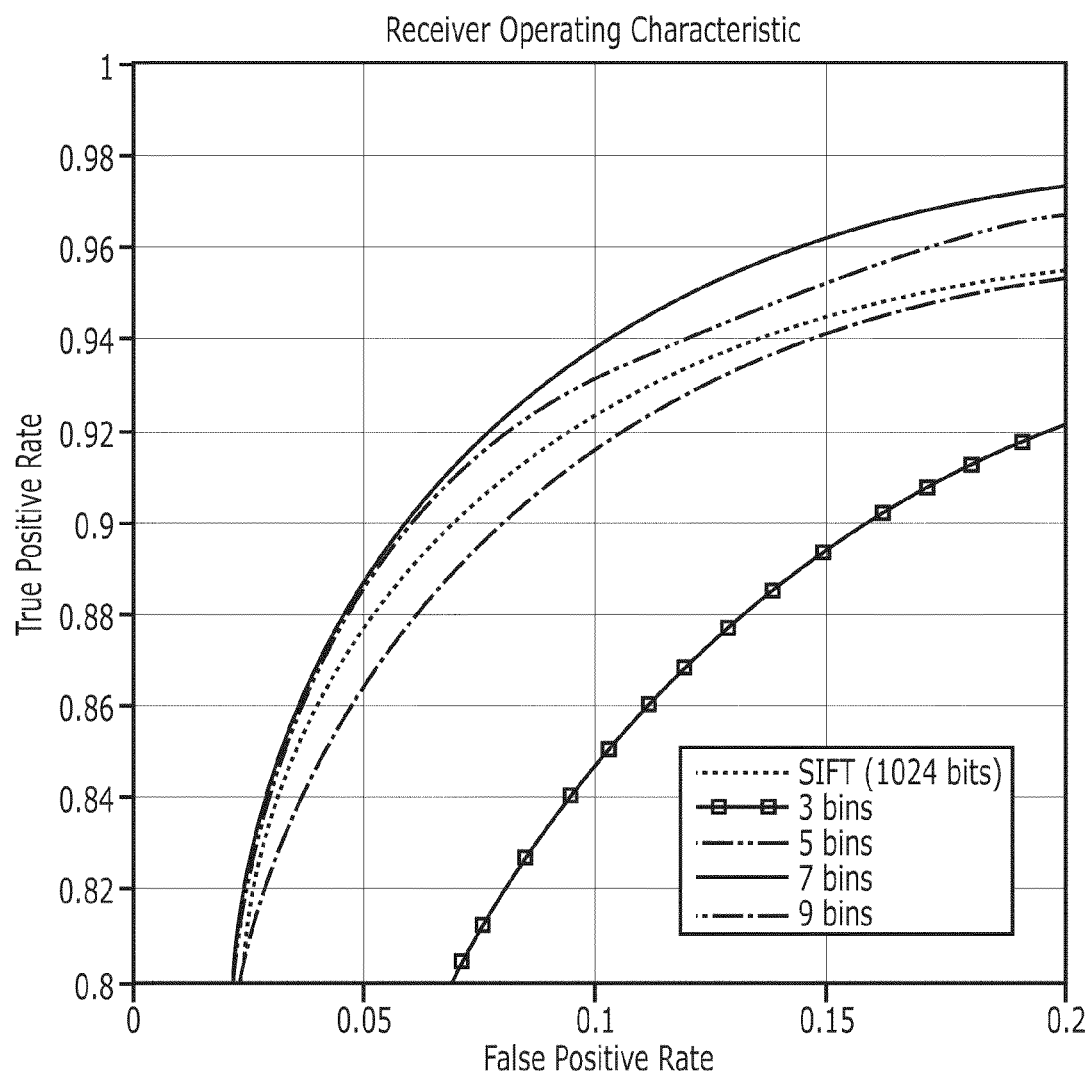
Figure 9B:
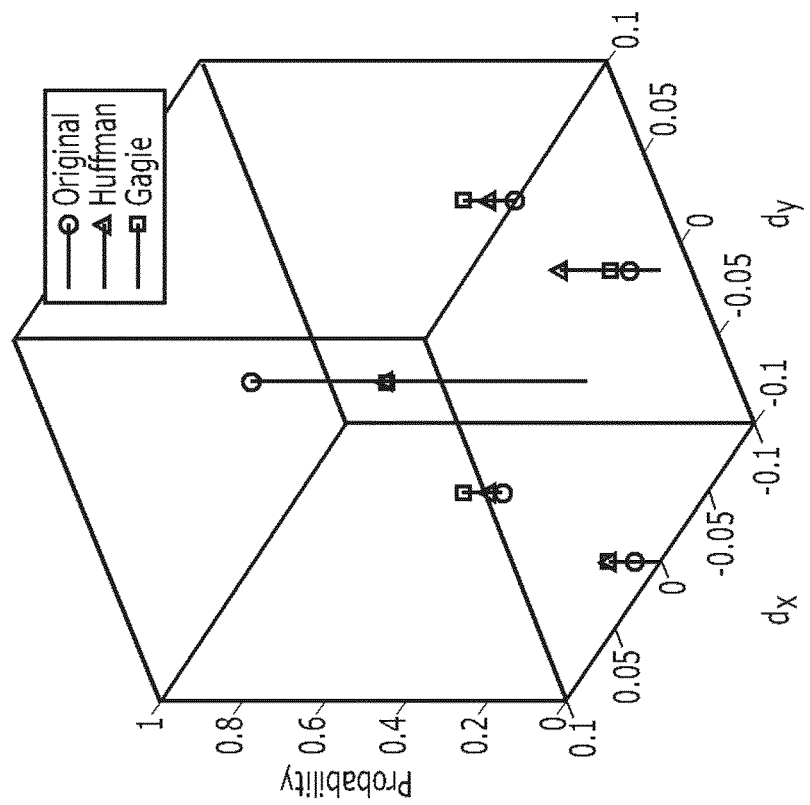
Figure 9A:
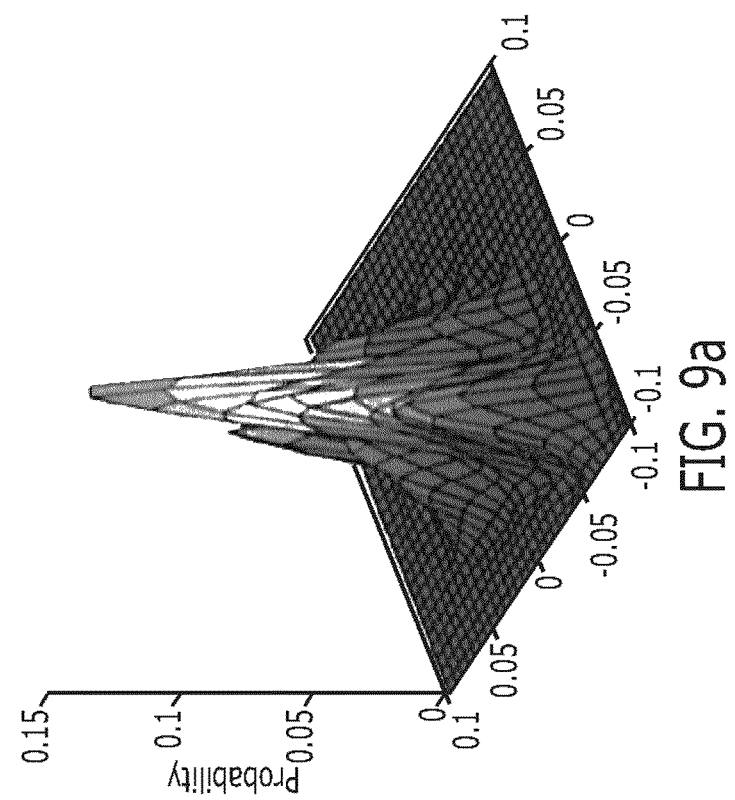
Figure 10:
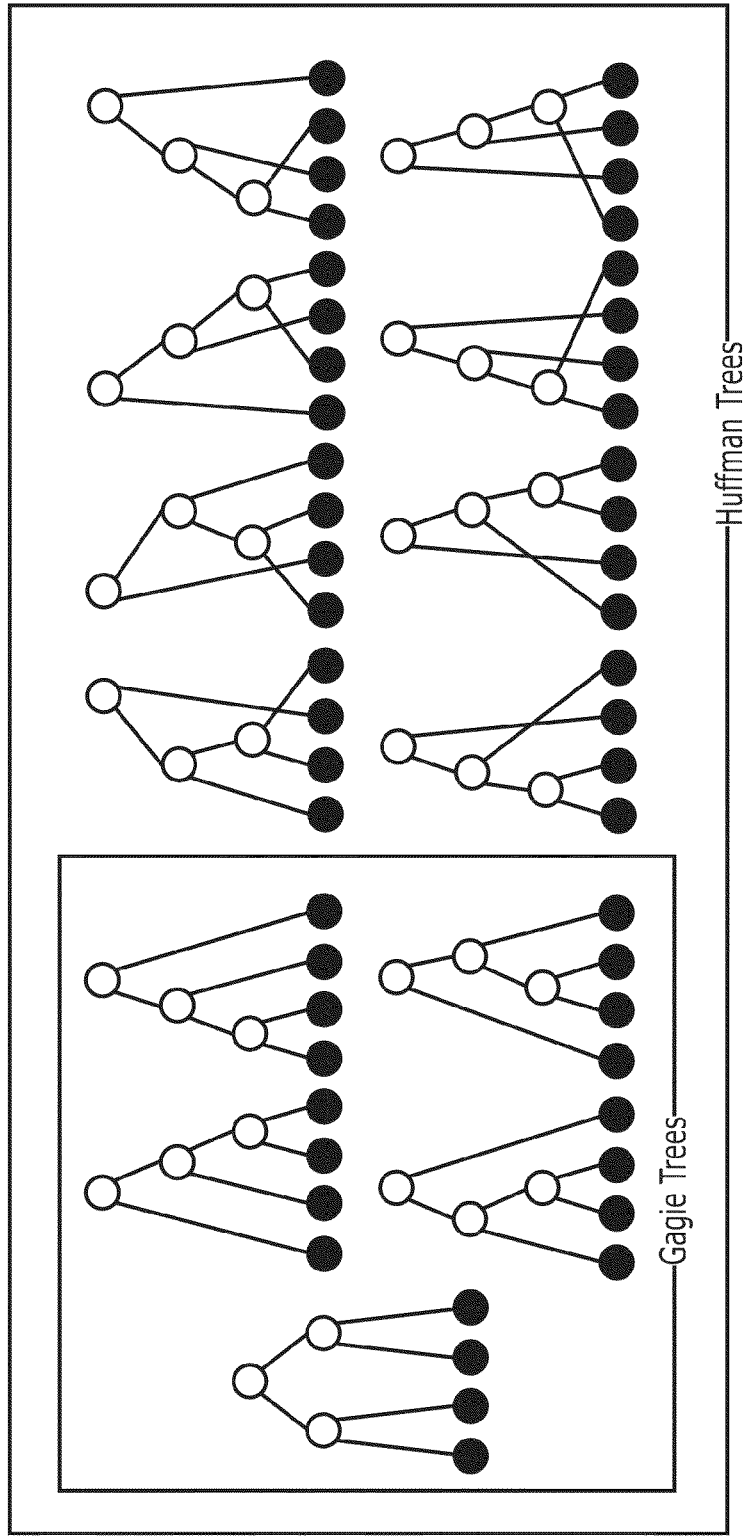
Figure 11:
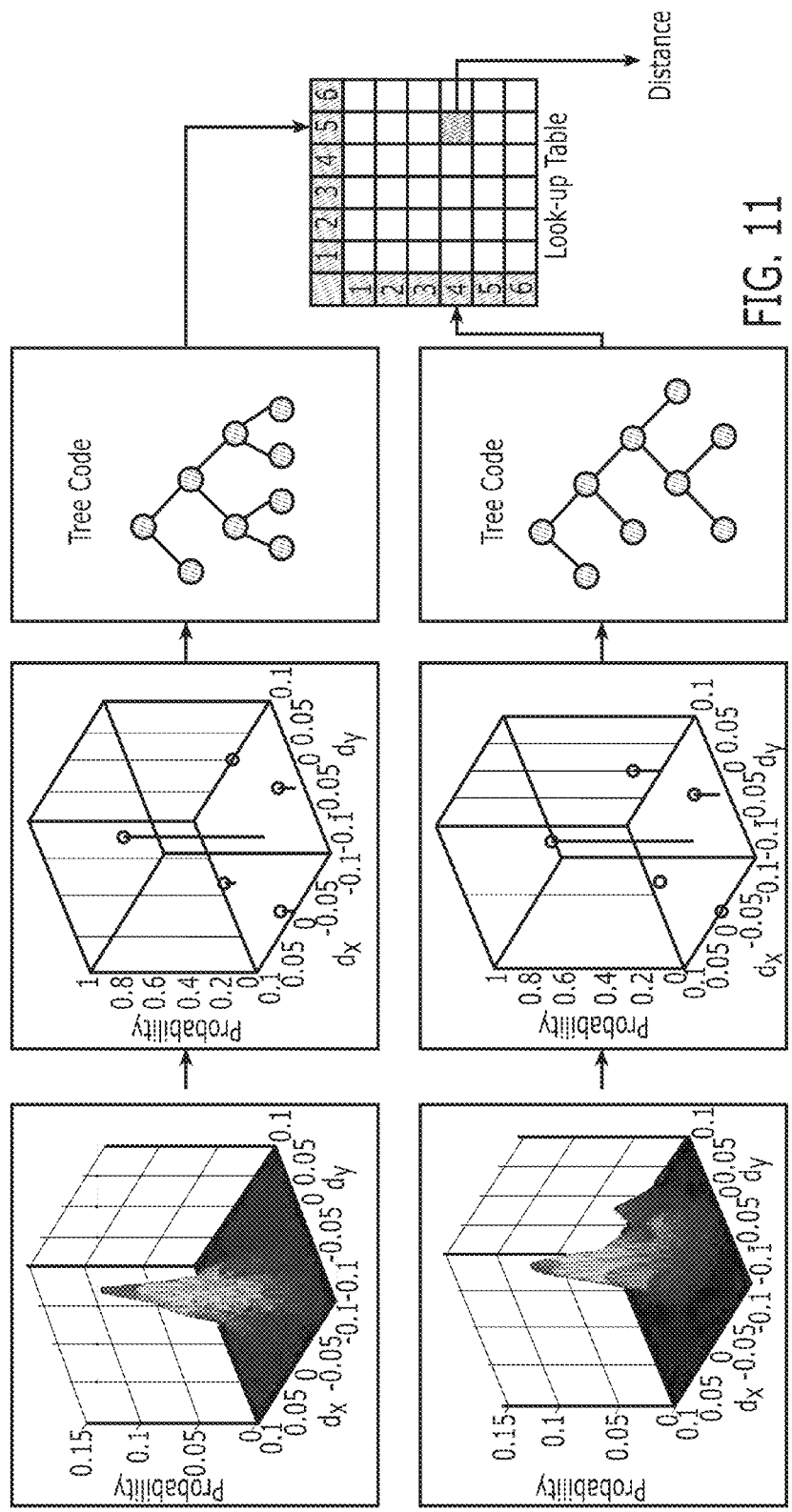
Figure 12:
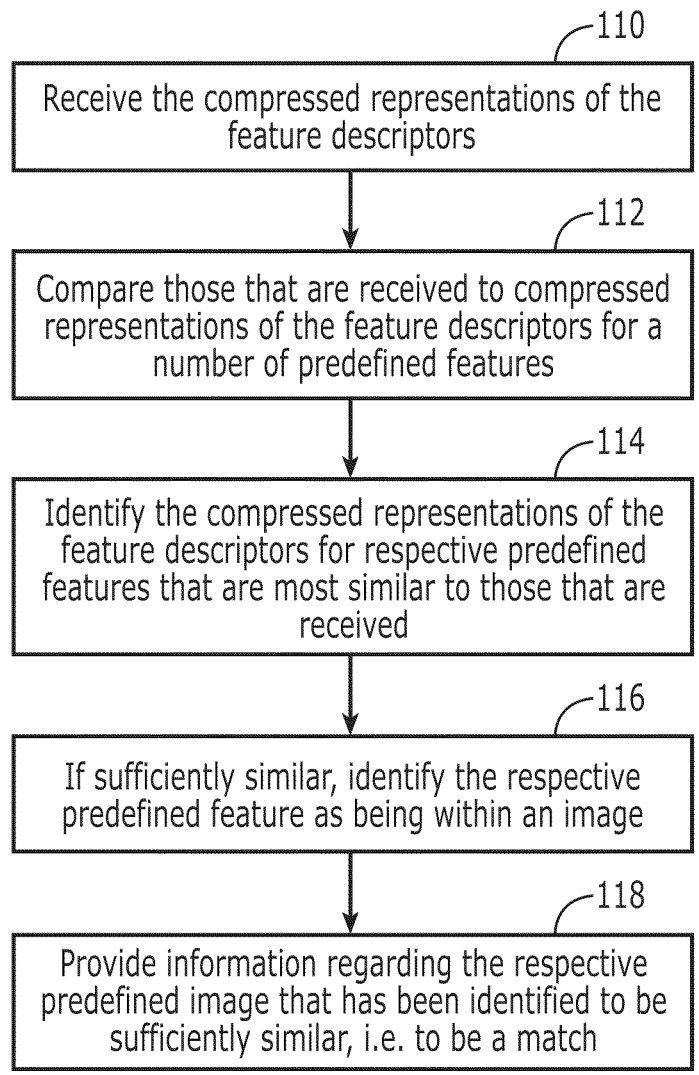

Having thus described the invention in general terms, reference will now be made to the accompanying drawings, which are not necessarily drawn to scale, and wherein:

FIG. 1 illustrates a schematic block diagram of a system for supporting the generation, transmission and identification of feature descriptors in accordance with embodiments of the present invention;

FIG. 2 is a schematic block diagram of an apparatus for generating feature descriptors in accordance with embodiments of the present invention;

FIG. 3 is a schematic block diagram of an apparatus for identifying compressed representations of feature descriptors in accordance with another embodiment of the present invention;

FIG. 4 is a flow diagram illustrating a sequence of operations for generating a plurality of feature descriptors in accordance with one embodiment of the present invention;

FIGS. 5a and 5b represent a joint distribution of x,y gradients for a large number of cells and a contour plot of the joint x,y gradient distribution, respectively;

FIGS. 6a-6d represent the distribution of x,y gradients for four different individual cells which are combined, potentially with the distributions of other cells, to comprise the joint distribution of x, y gradients of FIG. 5a;

FIGS. 7a-7e illustrate five different bin configurations that may be utilized in conjunction with embodiments of the present invention;

FIG. 8 depicts the receiver operating characteristics for the approximations provided by the four different bin configurations depicted in FIGS. 7a-7d in accordance with embodiments of the present invention relative to that provided by scale invariant feature transform (SIFT);

FIG. 9a represents a gradient distribution for a cell and FIG. 9b represents gradient histograms of the distribution shown in FIG. 9a in an uncompressed form and following Gagie and Huffman tree coding in accordance with embodiments of the present invention;

FIG. 10 is a representation of the Gagie trees and the Huffman trees that can be constructed to have four leaves;

FIG. 11 illustrates the Huffman tree coding of gradient histograms of two cells as well as the pre-computation of distances between pairs of the gradient distributions in accordance with embodiments of the present invention; and FIG. 12 is a flow diagram illustrating another sequence of operations for identifying a compressed representation of a feature descriptor in accordance with another embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Referring now to FIG. 1, a system that could benefit from embodiments of the present invention is depicted. As shown, the system includes one or more communications terminals 10 that may be in communication with one another and with various network entities via a network 12. While embodiments of the communications terminal are illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, or any combination of the aforementioned, and other types of voice and text communications systems, may employ embodiments of the present invention. Furthermore, communications terminals that are not mobile may also employ embodiments of the present invention. Additionally, the network may be any type of wired or wireless network that is configured to support communications between various communications terminals and various network entities. For example, the network may include a collection of various different nodes, devices or functions, such as application server 14, that may be in communication with each other via corresponding wired and/or wireless interfaces. Although not necessary, in some embodiments, the network may be capable of supporting communications in accordance with any one or more of a number of first-generation (1G), second-generation (2G), 2.5G, third-generation (3G), 3.5G, 3.9G, fourth-generation (4G) mobile communication protocols, long-term evolution (LTE), and/or the like.

In accordance with one embodiment of the present invention, the communications terminal 10 may capture an image, such as an image of Memorial Church in the depiction of FIG. 1. As described below, the communications terminal of one embodiment may then generate and compress a number of feature descriptors representative of various features within the image. The communications terminal may then communicate the compressed feature descriptors via a network 12 to a network entity, such as application server 14 as shown in FIG. 1. The server of this embodiment may then compare the compressed feature descriptors of the image captured by the communications device to a database of compressed feature descriptors representative of various predefined features. The server may then identify the predefined features having feature descriptors that are most similar to the feature descriptors of the image captured by the communications terminal and, if the feature descriptors are sufficiently similar, the server may identify features within the image, such as buildings, landmarks or the like, to be the same as the predefined features stored by the database. The server may then communicate with the communications terminal to provide information that identifies the feature(s) within the image and, in some instances, may provide additional information related to the feature(s), such as its name, address, historical information, marketing information or the like.

Although the communications terminal 10 may be configured in various manners, one example of a communications terminal that could benefit from embodiments of the invention is depicted in the block diagram of FIG. 2, which illustrates a mobile station 20. While an embodiment of a communications terminal will be illustrated and hereinafter described for purposes of example, other types of communications terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications devices, may employ embodiments of the present invention. As described, the communications terminal may include various means for performing one or more functions in accordance with embodiments of the present invention, including those more particularly shown and described herein. It should be understood, however, that a communications terminal may include alternative means for performing one or more like functions, without departing from the spirit and scope of the present invention.

The mobile station 20 of the illustrated embodiment may include an antenna 32 (or multiple antennas) in operable communication with a transmitter 34 and a receiver 36. The mobile station may further include an apparatus, such as a processor 40, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile station may be capable of operating with one or more air interface standards, communication protocols, modulation types, and access types. By way of illustration, the mobile station may be capable of operating in accordance with any of a number of first, second, third and/or fourth-generation communication protocols or the like. For example, the mobile station may be capable of operating in accordance with second-generation (2G) wireless communication protocols IS-136, global system for mobile communications (GSM) and IS-95, or with third-generation (3G) wireless communication protocols, such as universal mobile telecommunications system (UMTS), code division multiple access 2000 (CDMA2000), wideband CDMA (WCDMA) and time division-synchronous code division multiple access (TD-SCDMA), with 3.9G wireless communication protocol such as E-UTRAN (evolved-UMTS terrestrial radio access network), with fourth-generation (4G) wireless communication protocols or the like.

It is understood that the apparatus, such as the processor 40, may include circuitry implementing, among others, audio and logic functions of the mobile station 20. The processor may be embodied in a number of different ways. For example, the processor may be embodied as various processing means such as a processing element, a coprocessor, a controller or various other processing devices including integrated circuits such as, for example, an ASIC (application specific integrated circuit), an FPGA (field programmable gate array), a hardware accelerator, and/or the like. In an example embodiment, the processor may be configured to execute instructions stored in a memory device or otherwise accessible to the processor. As such, the processor may be configured to perform the processes, or at least portions thereof, discussed in more detail below with regard to FIGS. 4 and 12. The processor may also include the functionality to convolutionally encode and interleave message and data prior to modulation and transmission. The processor may additionally include an internal voice coder, and may include an internal data modem.

The mobile station 20 may also comprise a user interface including an output device such as an earphone or speaker 44, a ringer 42, a microphone 46, a display 48, and a user input interface, which may be coupled to the processor 40. The user input interface, which allows the mobile station to receive data, may include any of a number of devices allowing the mobile station to receive data, such as a keypad 50, a touch display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile station may include an interface device such as a joystick or other user input interface. The mobile station may further include a battery 54, such as a vibrating battery pack, for powering various circuits that are used to operate the mobile station, as well as optionally providing mechanical vibration as a detectable output.

The mobile station 20 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile station may be equipped with memory. For example, the mobile station may include volatile memory 60, such as volatile Random Access Memory (RAM) including a cache area for the temporary storage of data. The mobile station may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile station to implement the functions of the mobile station. For example, the memories may include an identifier, such as an international mobile equipment identification (IMEI) code, capable of uniquely identifying the mobile station.

While a communications terminal, one example of which is depicted in FIG. 2, may generate compressed representations of one or more feature descriptors in accordance with embodiments of the present invention, a network entity, such as an application server 14 or the like, that is in communication with the communications terminal may also employ embodiments of the present invention to identify the feature(s) within the image based on an analysis of the compressed representations of the feature descriptors. Referring to FIG. 3, for example, a block diagram of a network entity 68 capable of operating as a server 14 or the like is shown in accordance with one embodiment of the present invention. The network entity may include various means for performing one or more functions in accordance with embodiments of the present invention, including those more particularly shown and described herein. It should be understood, however, that the network entity may include alternative means for performing one or more like functions, without departing from the spirit and scope of the present invention.

As shown, a network entity 68 may include means, such as a processor 70 for performing or controlling its various functions. The processor may be embodied in a number of different ways. For example, the processor may be embodied as various processing means such as a processing element, a coprocessor, a controller or various other processing devices including integrated circuits such as, for example, an ASIC, an FPGA, a hardware accelerator, and/or the like. In an example embodiment, the processor may be configured to execute instructions stored in the memory or otherwise accessible to the processor. As such, the processor may be configured to perform the processes, or at least portions thereof, discussed in more detail below with regard to FIG. 12.

In one embodiment, the processor 70 may be in communication with or include memory 72, such as volatile and/or non-volatile memory that stores content, data or the like. For example, the memory may store content transmitted from, and/or received by, the network entity. Also for example, the memory may store software applications, instructions or the like for the processor to perform functions associated with operation of the network entity 68 in accordance with embodiments of the present invention. In particular, the memory may store software applications, instructions or the like for the processor to perform the operations described above and below with regard to FIG. 12 for identifying feature(s) within an image based upon an analysis of compressed representations of the feature descriptors.

In addition to the memory 72, the processor 70 may also be connected to at least one interface or other means for transmitting and/or receiving data, content or the like. In this regard, the interface(s) can include at least one communication interface 74 or other means for transmitting and/or receiving data, content or the like, such as between the network entity 68 and the communications terminal 10 and/or between the network entity and the remainder of network 12.

In operation and as shown in FIG. 4, in order to represent features within an image with appropriate feature descriptors, a communications terminal 10 and, in one embodiment, the processor 40 of the communications terminal may divide the image into a plurality of image patches, such as canonical patches around a point of interest. See operation 80. Each patch may then be normalized to achieve invariance under affine changes in intensity, such as by normalizing the mean and standard deviation of the pixel values of a respective patch to compensate for an affine transformation of aI+b of the pixel intensities I. See operation 82. Each patch may then be blurred or smoothed, such as in accordance with Gaussian smoothing with a smoothing parameter σ, such as 2.7 pixels in one embodiment. Each patch may then be divided into a plurality of smaller cells. See operation 84. As described below, the cells may be various sizes with scale invariant feature transform (SIFT) techniques and speeded up robust features (SURF) techniques utilizing 4×4 square grid configurations while gradient location and orientation histogram (GLOH) techniques use a large polar grid configuration.

Once the patches have been divided into smaller cells, the processor 40 of the communications terminal 10 may determine the x and y gradients within each cell, such as by using a centered derivative mask [−1, 0, 1]. See operation 86 of FIG. 4. The gradients may be determined in various manners. For example, the gradients may be determined by SIFT techniques in which the gradient orientation within each cell is quantized to eight bits and the gradient magnitude along each direction is summed. Alternatively, the gradients may be determined in accordance with a SURF technique with a SURF descriptor including Σdx, Σdy, Σ|dx| and Σ|dy| for each cell in contrast to the quantization of the gradients in SIFT that bins the gradients along angular directions. Further, the gradients may be determined in accordance with GLOH techniques.

Although the gradients will vary depending upon the image and the technique by which the gradients are determined, the joint distribution of x,y gradients for a large number of cells of one example is depicted in FIG. 5a with the contour plot of this joint x,y gradient distribution being depicted in FIG. 5b. By way of reference, the joint x,y gradient distribution of FIG. 5 is comprised of the individual distributions of a number of cells, four of which are depicted in FIGS. 6a-6d for purposes illustrating the potential variance therebetween. The joint x,y gradient distribution in a respective cell, such as those depicted in FIGS. 6a-6d, can be defined as $P_{D_X,D_Y}(D_X, D_Y)$ with N being the number of pixels in a cell. The gradients may then be quantized, as shown in block 88 of FIG. 4. In some embodiments, however, the gradients within a cell may be weighted by a Gaussian window prior to quantization and the eventual determination of corresponding feature descriptors.

In order to quantize the gradients, the gradients may be assigned to a respective one of a plurality of bins. Prior to this assignment process, however, a configuration of bins may be selected in order to accurately and efficiently represent a joint x,y gradient distribution. See operations 90 and 92 of FIG. 4. In order to select a configuration of bins in terms of the number of bins and the x,y location of the bins in order to appropriately and efficiently represent a joint x,y gradient distribution, the joint x,y gradient distribution, such as depicted in FIG. 5a is considered with the x,y gradient pair that is most common being identified, along with any skew of the distribution. With respect to the joint x,y gradient distribution of FIG. 5a, the x,y gradient pair at (0,0) occurs with the highest probability and the distribution is skewed somewhat along the y-axis as shown in FIG. 5b. In order to approximate the gradient distribution, a plurality of bins may be defined with several exemplary bin configurations depicted in FIGS. 7a-7e. In one embodiment, the bin configurations have a bin positioned at the location having the greatest probability and are skewed in the same direction or orientation as the distribution itself. For example, each of the exemplary bin configurations depicted in FIGS. 7a-7e has a bin at (0,0), is either symmetrical or slightly skewed in the direction of the y-axis and is evenly angularly spaced over 0°-360°. In order to quantize the gradients, the dx, dy gradient pair for each pixel in a cell is assigned to the closest bin.

In order to increase the efficiency of the quantization process, it may be desirable to have a relatively few number of bins. However, it may also be desirable to have a sufficient number of bins such that the resulting approximation of the joint x,y gradient distribution is sufficiently accurate. By way of example but not of limitation, the accuracy provided by the four different bin configurations depicted in FIGS. 7a-7d having 3, 5, 7 and 9 bins, respectively, in conjunction with the approximation of the joint x,y gradient distribution of FIG. 5a was compared in terms of their receiver operating characteristics by comparing the true positive rate versus the false positive rate for each of the four different bin configurations to that provided by SIFT. As shown in FIG. 8, the approximation utilizing five bins as shown in FIG. 7b could, in one exemplary scenario, substantially match the performance of SIFT, while the approximation of the joint x,y gradient distribution with 7 bins as shown in FIG. 7c, respectively, may offer improved performance relative to SIFT, albeit in a slightly less efficient manner than that offered by the five bin configuration of FIG. 7b.

Based on the quantization, the communications terminal 10 and, in one embodiment, the processor 40 of the communications terminal may generate a plurality of feature descriptors $D^i_{CHOG}$ wherein i, ranging in value from 1 to K, is defined as an index of the patch for which the descriptor is computed and K is the number of patches detected in an image. See block 94 of FIG. 4. In one embodiment, each feature descriptor may be defined, for a respective cell, in terms of and so as to include the distribution of the gradients between the plurality of bins, e.g., by a probability distribution. In one embodiment, the plurality of feature descriptors may be defined as: $D^i_{UHOG} = \{P^i_1, P^i_2, \ldots P^i_n\}$, where $P^i_1, \ldots P^i_n$ represent the gradient distributions in cells 1 . . . n of descriptor i. The dimensionality of each descriptor may be defined as n×B wherein n is the number of cells and B is the number of bins.

The definition of the feature descriptors directly in terms of the gradient distributions, e.g., probability distributions, may be advantageous. In this regard, by representing the gradient information as a probability distribution for each cell, the statistics of the underlying gradient distribution may be advantageously exploited by selectively placing the bin centers as described above based upon the location of the x,y gradient with the greatest probability and based upon the skew of the joint x,y gradient distribution. Additionally, probability distributions can be compared more effectively using distance measures like Kullback-Leiblier (KL) Divergence and Earth Mover's Distance (EMD) compared to the L-2 norm. Further, probability distributions may be compressed efficiently to create low bit rate descriptors, as described below.

Once the gradient distribution has been determined and the feature descriptors have been computed, the communications terminal 10 and, in one embodiment, the processor 40 of the communications terminal may compress the feature descriptors consisting of the gradient distributions in the respective cells. See operation 96 of FIG. 4. For example, the gradient distributions (and, in turn, the feature descriptors which are comprised of the gradient distributions) may be compressed by tree coding, such as Gagie tree coding or Huffman tree coding, as described in T. Gagie, "*Compressing Probability Distributions*", Inf. Process. Lett., Vol. 97, No. 4, pp. 133-37 (2006). In order to consider these tree coding approaches, let $P=p_1, p_2, \ldots p_n$ be the original distribution, and $Q=q_1, q_2, \ldots q_n$ be the lossily compressed probability distribution defined over the same sample space. In embodiments utilizing Huffman tree coding, P is compressed by constructing a Huffman tree over the distribution and storing the Huffman codes of each symbol, thereby guaranteeing a KL divergence D between the two distributions (P and Q) of $D(P\|Q)<1$, and requiring $O(n \log n)$ bits of space. If fixed length codes are used to store the depth of each symbol in a Huffman tree, a Huffman tree can be stored in $(n-1)[\log(n-1)]$ bits. Alternatively, if Gagie tree coding is utilized, a distribution Q can be constructed such that $D(P\|Q)<\log_2(2+2^{3-k})$, where Q can be stored in exactly $kn-2$ bits.

The differences between Gagie and Huffman tree coding can be understood by considering the Gagie and Huffman trees themselves. In this regard, Gagie trees are ordered and, hence, the tree itself stores information of the entire distribution P. On the other hand, Huffman trees are not ordered as symbol probabilities that get sorted in the tree building process. Thus, Huffman tree results in a lower $D(P\|Q)$ of 1, but requires a higher number of bits $(n-1)[\log(n-1)]$, compared to $2n-2$ bits for Gagie trees.

In conjunction with the compression of gradient distributions in each cell, the bit rate increases for both Gagie and Huffman trees as the number of bins increases, and so does the performance of the feature descriptor. By way of example but not of limitation, the gradient distribution of one cell is depicted in FIG. 9a. Following quantization utilizing five bins as configured in FIG. 7b, the resulting histogram is depicted in FIG. 9b. This histogram is then separately compressed with both Huffman and Gagie trees with the resulting distributions as depicted in FIG. 9b. For the same initial distribution P and the same resulting compressed distribution Q, the Gagie (upper) and Huffman (lower) tree coding schemes are shown below:

| P | S | C | Gagie Tree | Q |
|---|---|---|---|---|
| 0.8281 | 0.4141 | 0 | | 0.500 |
| 0.0000 | 0.8281 | 11010 | | 0.125 |
| 0.0312 | 0.8438 | 11011 | | 0.125 |
| 0.0625 | 0.8906 | 1110 | | 0.125 |
| 0.0781 | 0.9609 | 1111 | | 0.125 |

| P | Sort(P) | Huffman Tree | C | Q |
|---|---|---|---|---|
| 0.8281 | 0.0000 | | 1 | 0.5000 |
| 0.0000 | 0.0312 | | 0000 | 0.0625 |
| 0.0312 | 0.0625 | | 0001 | 0.0625 |
| 0.0625 | 0.0781 | | 001 | 0.1250 |
| 0.0781 | 0.8281 | | 01 | 0.2500 | wherein C is the Catalan number as described below and S is defined as $S=\{s_1, \ldots, s_n\}$ $$\text{such that } s_i = \frac{p_i}{2} \sum_{j=1}^{i-1} p_j$$

In this example, the KL divergence for the Gagie tree coding is 0.2945 and the KL divergence for the Huffman tree coding is 0.2620. It is also noted that in one embodiment compression with Gagie trees may adversely affect the performance of the feature descriptors more than compression with Huffman trees. This difference may result from the lower KL divergence of 1 that arises from compressing distributions with Huffman trees. As such, while the gradient distributions of the feature descriptors may be compressed in various manners including utilizing various tree coding techniques, Huffman tree coding may be advantageous in one embodiment.

The compression of the gradient distributions in each cell permits the corresponding feature descriptors to be represented with fewer bits since the feature descriptors are, in turn, defined as a collection of the gradient distributions. Moreover, by compressing and transmitting the gradient distributions using a tree-based approximation, a bound on distortion is provided. In order to further reduce the number of hits required to define the various feature descriptors, the number of cells in each image patch could be reduced. However, it may only be desirable to reduce the number of cells in a patch only if this reduction could be accomplished without appreciably affecting the performance of the resulting feature descriptor. As noted above, SIFT and SURF techniques utilize a square grid with sixteen cells, while GLOH techniques utilize large polar histograms with different numbers of cells, such as 9 or 7, As such, the performance offered by different cell configurations in terms of the number of bits required to define respective features may be compared with the cell configuration that offers suitable performance for the particular application with the least number of bits required to represent the feature descriptors being utilized in one embodiment. In this regard, the sixteen cells utilized by SIFT and SURF techniques (a grid 16 configuration) may be compared to GLOH approaches utilizing 9 or 7 cells termed GLOH 9 and GLOH 7, respectively. In one scenario, feature descriptors generated in accordance with a GLOH 9 configuration performed comparably to the feature descriptors generated in accordance with a grid 16 configuration, while providing a bit reduction rate of 44%. In one embodiment, because it offers improved performance at a lower bit rate, GLOH 9 may be the configuration of choice.

As described above in conjunction with FIG. 1, applications that require feature identification may require relatively large numbers of features to be transmitted and/or stored. For example, in the context of mobile devices, e.g., camera phones, and/or distributed camera networks, the communication and power costs for transmitting information between nodes may be significant. In order to provide scalability and efficiency, the identification of various features by feature descriptors that can be represented with a relatively small number of bits in accordance with one embodiment of the present invention is advantageous. For example, the number of bits that is required for each feature descriptor may be relevant in image retrieval applications in which one or more feature descriptors of a query image must be matched against a number of predefined feature descriptors. Since the predefined feature descriptors may be stored in a database at or accessible by a server 14 and since many, e.g., millions, feature descriptors may be stored by the database, reductions in the number of bits required to define a feature descriptor as provided by embodiments of the present invention can result in meaningful savings in terms of the storage that is required. Additionally, a reduction in the number of bits required to define the feature descriptors may reduce system latency by reducing the quantity of data that must be transmitted over a network in order to identify features within an image. Similarly, a reduction in the number of bits required to represent the feature descriptors may reduce the bandwidth required for the data transmission necessary for feature identification, thereby making such transmission more easily supportable by mobile applications in which data is transmitted over a wireless channel and the back-haul links of a mobile network.

In order to facilitate the analysis of feature descriptors in their compressed representation, such as by a server 14 relative to a plurality of compressed feature descriptors in a library of predefined features, it may be desirable for each compressed gradient distribution to be represented by a fixed length code as shown in operation 97 of FIG. 4, as opposed to having a variable length of hits as would generally result from utilizing Huffman tree coding. As noted before, compressed Gagie distributions are represented as strict ordered binary trees. Huffman trees can be enumerated by considering the permutations of the leaf nodes of Gagie Trees. The number of strict ordered binary trees with n leaf nodes may be given by the Catalan number $$C(n) = \frac{1}{n}\binom{2(n-1)}{n-1}.$$

As shown in FIG. 10 for a tree having four leaf nodes, the Gagie trees are a subset of the Huffman trees which can be enumerated by considering all unique permutations of the leaf nodes of Gagie trees. For example, the number of Gagie and Huffman trees for 1 to 7 leaf nodes is shown in the following table:

| # Bins | # Gagie Trees | # Huffman Trees |
|---|---|---|
| 1 | 1 | 1 |
| 2 | 1 | 1 |
| 3 | 2 | 3 |
| 4 | 5 | 13 |
| 5 | 14 | 75 |
| 6 | 42 | 525 |
| 7 | 132 | 4347 |

For a relatively small number of quantization bins, e.g., up to 7 bins, the number of Huffman and Gagie trees is also relatively small. In such a scenario, all possible tree combinations can be enumerated. Additionally, the distances between the different compressed distributions may be pre-computed and stored, such as in a distance table. This allows the distances between descriptors to be computed efficiently, such as by performing look-ups in a distance table, FIG. 11 illustrates compressed domain matching for a five bin configuration as shown in FIG. 7b. In this regard, the gradient histogram in each cell (two cells being shown in FIG. 11) may be compressed using Huffman tree coding such that there are 75 possible trees for five leaf nodes, which can be represented with 7 bits per cell. The distances, e.g., computed in accordance with KL, EMD, I2, etc., between all pairs of distributions may be pre-computed and stored as shown in FIG. 11. The distance between two descriptors may then be calculated by summing the pre-computed distances between compressed gradient distributions in corresponding cells. More effective histogram comparison measures, such as KL divergence and EMD can be used with no additional complexity.

It is also noted that the probabilities of the different trees is different. Hence, further compression gains can be achieved by entropy coding the tree indices, such as by means of an arithmetic coder, as shown in operation 98 of FIG. 4, with the more frequently occurring tree indices being represented by shorter codes and more seldomly occurring tree indices being represented by longer codes. For Gagie tree coding, entropy coding the tree indices may provide a 2× reduction in bit rate compared to storing the strict ordered binary trees. Similarly, for Huffman tree coding, entropy coding the tree indices may provide a 2× reduction in bit rate compared to storing the Huffman codes for all symbols.

By way of example, in one embodiment that utilizes 5 bins as shown in FIG. 7b, a GLOH 9 configuration of cells and Huffman tree coding, a feature descriptor may have 45 dimensions, i.e., 5 dimensions (one for each bin) for the compressed gradient distribution within each cell and 9 cells from the GLOH 9 configuration. In this example, there are 75 possible compressed Huffman tree distributions for each cell for a total of $75^9$ unique feature descriptors. Uncompressed, each cell can be represented in this example by 7 bit, e.g., log 75, fixed length codes such that 9 cells would require 63 bits. By entropy coding the tree indices, the feature descriptor may be reduced to 52 bits, while still performing comparably to SIFT in at least some embodiments.

Once the feature descriptors have been defined and compressed, the compressed representations of the feature descriptors may be transmitted and/or stored, as shown in operation 100 of FIG. 4. In the embodiment of the present invention depicted in FIG. 1, the communications device 10 may determine the feature descriptors for various features within the image captured by the communications device. A compressed representation of the feature descriptors may then be stored by the communications device and transmitted by the communications device to the server 14 via the network 12. In this embodiment, the server may, in turn, receive and compare the compressed representations of the feature descriptors to the compressed representations of a plurality of feature descriptors for a number of predefined features. See operations 110 and 112 of FIG. 12.

In this comparison process, the server can identify the compressed representations of the feature descriptors for the predefined features that are most similar to the compressed representations of the feature descriptors provided by the communications device. See operation 114. In instances in which the compressed representations of the feature descriptors of the predefined features are sufficiently similar to the compressed representations of the feature descriptors provided by the communications device, such as by being separated by a distance as described below that is less than a predefined threshold, the server may identify the respective predefined feature(s) as being within the image captured by the communications device. See operation 116. The server may then provide information to the communications device relating to the predefined feature(s) that have been identified as a result of the comparison process. See operation 118. For example, the server can provide an identification of the recognized feature(s), such as by name, location, etc. Additionally, the server can provide any other information that is associated with the recognized feature(s), such as historical information, marketing information, or the like. By way of example, if the server recognizes the compressed feature descriptors to be representative of a restaurant, the server may provide the name, address and website of the restaurant along with information regarding its hours of operation, its menu and reviews of the restaurant.

In order to compare the compressed representations of the feature descriptors provided by the communications device 10 in accordance with the foregoing embodiment with the compressed representations of the feature descriptors of various predefined features, the server 14 may determine the distance between the compressed representations. Several quantitative measures may be utilized to compare distributions, such as the L-2 norm, KL Divergence, and the EMD. KL Divergence finds its roots in information theory, and represents the information divergence between two distributions. The KL Divergence between two distributions $P = p_1, p_2, \ldots p_n$ and $Q = q_1, q_2, \ldots q_n$ is defined as $$D(P\|Q) = \sum_{k=1}^{i=n} \left( p_i \log\left(\frac{pi}{qi}\right) \right)$$

In some embodiments, a smoothing term such as of $\rho = 0.001$, may be added to the denominator in the foregoing equation to prevent any determination of $\infty$ as the distance measure. It is noted, however, that the results are not sensitive to the chosen $\rho$ parameter. The EMD, a special case of the Mallows distance, is a cross-bin histogram distance measure unlike $L_2$-norm and KL divergence, which are bin by bin distance measures. The EMD is defined as the minimum cost that must be paid to transform one histogram into the other, where there is a "ground distance" defined between each pair of bins. The "ground distance" between bins is defined as the distance between the bin-centers, such as in the configurations shown in FIG. 7. Note that EMD is a metric and follows the triangle inequality, while KL divergence does not.

The server 14 and, in one embodiment, the processor 70 of the server may determine the distance dist between two feature descriptors $D^i_{CHOG}$, $D^j_{CHOG}$ is defined as $$\text{dist}(D^i_{CHOG}, D^j_{CHOG}) = \sum_{k=1}^{k=n} d_{hist}(P^i_k, P^j_k)$$

where $d_{hist}$ is defined as a distance measure between two distributions. However, since the set of possible trees is relatively small, such as indicated by the foregoing table, the distances between each possible pair of trees may be determined in advance and stored in memory 72. As such, the server need not compute each distance, but may, instead, utilize a look-up table to identify the distance between trees based upon the predetermined distances, thereby increasing the efficiency with which the comparison is performed.

As described above, FIGS. 4 and 12 are flowcharts of an apparatus, method and program product according to some exemplary embodiments of the invention. It will be understood that each block of the flowcharts, and combinations of blocks in the flowcharts, can be implemented by various means, such as hardware, firmware, and/or computer program product including one or more computer program instructions. For example, one or more of the procedures described above may be embodied by computer program instructions. In this regard, the computer program instructions which embody the procedures described above may be stored by a memory device of a communications device 10, network entity such as a server 14 or other apparatus employing embodiments of the present invention and executed by a processor 40, 70 in the communications device, server or other apparatus. In this regard, the operations described above in conjunction with the diagrams of FIGS. 4 and 12 may have been described as being performed by the communications device and a network entity such as a server, but any or all of the operations may actually be performed by the respective processors of these entities, for example in response to computer program instructions executed by the respective processors. As will be appreciated, any such computer program instructions may be loaded onto a computer or other programmable apparatus (e.g., hardware) to produce a machine, such that the computer program product including the instructions which execute on the computer (e.g., via a processor) or other programmable apparatus create means for implementing the functions specified in the flowcharts block(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an exemplary embodiment, an apparatus for performing the method of FIGS. 4 and 12 may include a processor (e.g., the processor(s) 40 and/or 70) configured to perform some or each of the operations (80-118) described above. The processor(s) may, for example, be configured to perform the operations (80-118) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 80-118 may comprise, for example, the processor(s) 40 and/or 70 as described above.

Many modifications and other embodiments of the inventions set forth herein will come to mind to one skilled in the art to which these inventions pertain having the benefit of the teachings presented in the foregoing descriptions and the associated drawings. For example, while embodiments of the present invention have been described in conjunction with a communications device 10 capturing an image and then determining and compressing the feature descriptors for features within the image, the image itself may be transmitted and a network entity, such as the server 14, or other apparatus may define and compress the feature descriptors, such as prior to storage. Alternatively, while the comparison of the compressed representations of the feature descriptors was described in the embodiments above as being performed by a network entity, such as a server, the comparison and identification of corresponding features may be performed, instead, by the communications device or other apparatus, if so desired. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    dividing an image into a plurality of image regions;
    determining a plurality of gradients for each of a plurality of cells of an image region, wherein the image region is divided into the plurality of cells prior to determining the plurality of gradients;
    selecting a bin configuration, wherein selecting a bin configuration comprises selecting a bin configuration having a bin positioned at a location coinciding with the gradient having a greatest probability;
    assigning the gradients for a respective cell to a respective one of a plurality of bins of the bin configuration that has been selected;
    determining a plurality of feature descriptors, wherein each feature descriptor includes a representation of a distribution of gradients between the plurality of bins of a respective cell; and
    compressing the plurality of feature descriptors comprising the gradient distributions of the respective cells.

2. A method according to claim 1 further comprising entropy coding compressed representations of the plurality of feature descriptors.

3. A method according to claim 1 further comprising providing for at least one of transmission or storage of compressed representations of the plurality of feature descriptors.

4. A method according to claim 1 wherein selecting a bin configuration further comprises selecting a bin configuration that is skewed in a common direction as the distribution of gradients.

5. A method according to claim 1 wherein compressing the plurality of feature descriptors comprises utilizing tree coding to compress the plurality of feature descriptors.

6. An apparatus comprising at least one processor and at least one memory storing computer program code, wherein the at least one memory and stored computer program code are configured, with the at least one processor, to cause the apparatus at least to:
    divide an image into a plurality of image regions;
    determine a plurality of gradients for each of a plurality of cells of an image region, wherein the image region is divided into the plurality of cells prior to determining the plurality of gradients;
    select a bin configuration by selecting a bin configuration having a bin positioned at a location coinciding with the gradient having a greatest probability;
    assigning the gradients for a respective cell to a respective one of a plurality of bins of the bin configuration that has been selected;
    determine a plurality of feature descriptors, wherein each feature descriptor includes a representation of a distribution of gradients between the plurality of bins of a respective cell; and
    compress the plurality of feature descriptors comprising the gradient distributions of the respective cells.

7. An apparatus according to claim 6 wherein the at least one memory and stored computer program code are further configured, with the at least one processor, to entropy code compressed representations of the plurality of feature descriptors.

8. An apparatus according to claim 6 wherein the at least one memory and stored computer program code are further configured, with the at least one processor, to provide for at least one of transmission or storage of compressed representations of the plurality of feature descriptors.

9. An apparatus according to claim 6 wherein the at least one memory and stored computer program code are further configured, with the at least one processor, to select a bin configuration that is skewed in a common direction as the distribution of gradients.

10. An apparatus according to claim 6 wherein the at least one memory and stored computer program code are configured, with the at least one processor, to compress the plurality of feature descriptors by utilizing tree coding to compress the plurality of feature descriptors.

11. A method comprising:
    comparing a compressed representation of a feature descriptor with a plurality of predetermined compressed representations of feature descriptors of respective predefined features, wherein the feature descriptors include a representation of a distribution of gradients; and
    based upon comparison results, identifying the compressed representation of a feature descriptor to represent a predefined feature without first decompressing the feature descriptor.

12. A method according to claim 11 wherein comparing a compressed representation of a feature descriptor comprises determining a distance between the compressed representation of a feature descriptor and each predetermined compressed representation of a feature descriptor of a respective predefined feature.

13. A method according to claim 12 wherein identifying the compressed representation of a feature descriptor comprises identifying the predefined feature represented by the predetermined compressed representation of a feature descriptor that is separated by a distance less than a predefined threshold from the compressed representation of a feature descriptor.

14. A method according to claim 11 further comprising providing information regarding the predefined feature.

15. An apparatus comprising at least one processor and at least one memory storing computer program code, wherein the at least one memory and stored computer program code are configured, with the at least one processor, to cause the apparatus at least to:
- compare a compressed representation of a feature descriptor with a plurality of predetermined compressed representations of feature descriptors of respective predefined features, wherein the feature descriptors include a representation of a distribution of gradients; and
- based upon comparison results, identify the compressed representation of a feature descriptor to represent a predefined feature without first decompressing the feature descriptor.

16. An apparatus according to claim 15 wherein the at least one memory and stored computer program code are configured, with the at least one processor, to compare a compressed representation of a feature descriptor by determining a distance between the compressed representation of a feature descriptor and each predetermined compressed representation of a feature descriptor of a respective predefined feature.

17. An apparatus according to claim 16 wherein the at least one memory and stored computer program code are configured, with the at least one processor, to identify the compressed representation of a feature descriptor by identifying the predefined feature represented by the predetermined compressed representation of a feature descriptor that is separated by a distance less than a predefined threshold from the compressed representation of a feature descriptor.

18. An apparatus according to claim 15 wherein the at least one memory and stored computer program code are further configured, with the at least one processor, to provide information regarding the predefined feature.

* * * * *

UNITED STATES PATENT AND TRADEMARK OFFICE
CERTIFICATE OF CORRECTION

PATENT NO. : 9,710,492 B2
APPLICATION NO. : 12/617514
DATED : July 18, 2017
INVENTOR(S) : Grzeszczuk et al.

Page 1 of 1

It is certified that error appears in the above-identified patent and that said Letters Patent is hereby corrected as shown below:

On the Title Page

Item (73) should read:
--(73) Assignees: Nokia Corporation, Espoo (FI); Stanford University, Stanford, CA (US)--.

Signed and Sealed this
First Day of May, 2018

Andrei Iancu
*Director of the United States Patent and Trademark Office*